UNITED STATES PATENT OFFICE.

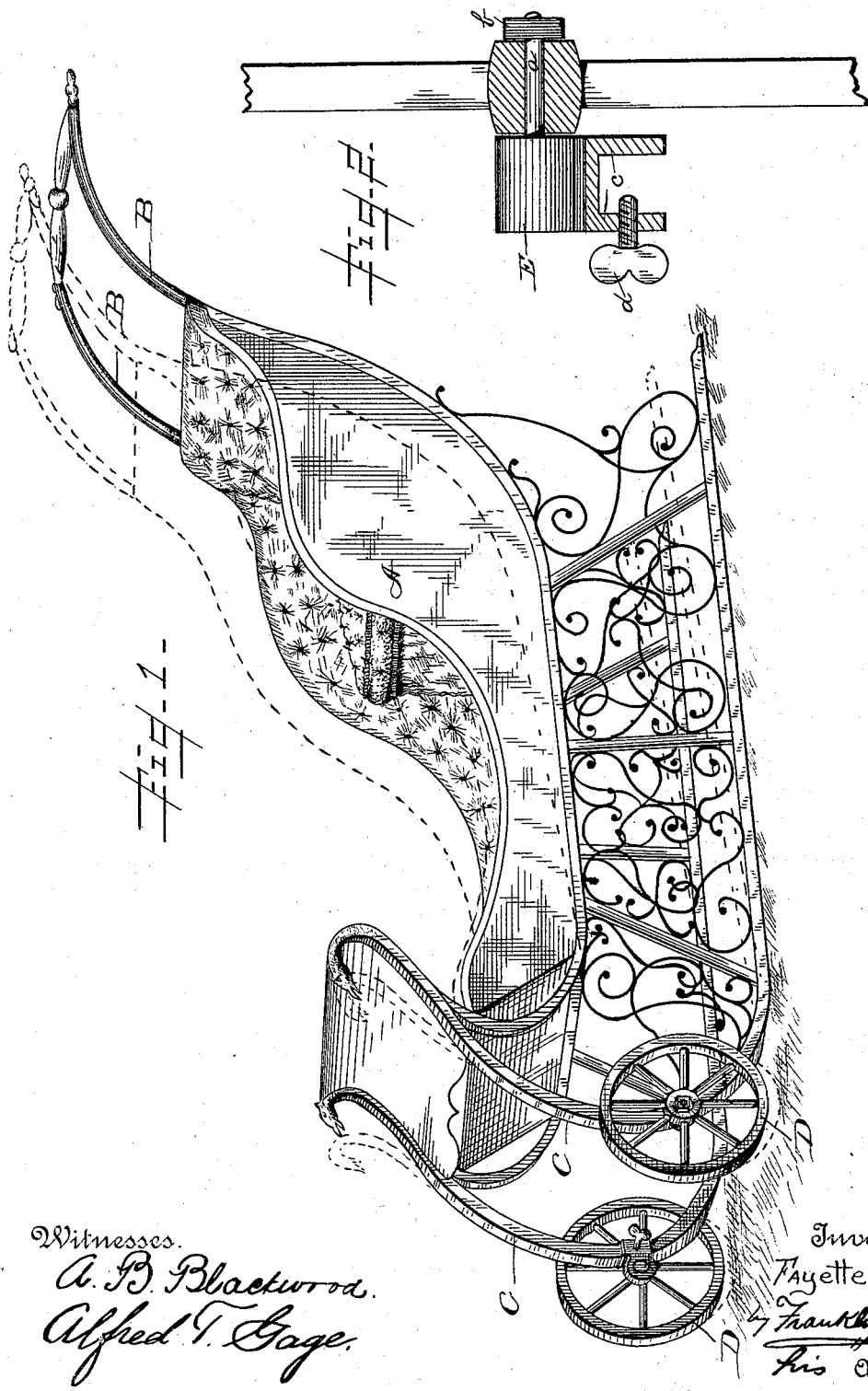

FAYETTE GROFF, OF SARATOGA SPRINGS, NEW YORK.

CHILD'S VEHICLE.

SPECIFICATION forming part of Letters Patent No. 383,948, dated June 5, 1888.

Application filed February 21, 1888. Serial No. 264,781. (No model.)

*To all whom it may concern:*

Be it known that I, FAYETTE GROFF, a citizen of the United States, residing at Saratoga Springs, in the county of Saratoga and State of New York, have invented certain new and useful Improvements in Children's Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in sleighs designed to be propelled by hand, and more particularly to children's vehicles; and it has for its object to provide a device of this character designed for use upon snow or ice, but which may be converted into a wheeled vehicle at will by the simple elevation of the rear end of the same.

It is generally the fact that however good the sleighing may be the street-crossings and many places upon the sidewalk are entirely cleared of snow, thus rendering it difficult to propel the sleigh over such places. By my construction, when such places are arrived at, it is only necessary to slightly elevate the rear end of the vehicle, which may be easily done by means of the handles, and as soon as the bare spot has been passed the rear end is lowered and we have a sleigh. Thus it will be seen that the vehicle is adapted for use either as a sleigh or a wheeled vehicle at will without adjustment of the wheels.

To these ends, and to such others as the invention may relate, the same consists in the peculiar combinations and in the novel construction, arrangement, and adaptation of parts, all as more fully hereinafter described, shown in the accompanying drawings, and then specifically defined in the claims.

In the accompanying drawings, Figure 1 is a perspective view of a vehicle constructed in accordance with my invention. Fig. 2 is a central sectional detail showing the preferred form of attaching the wheels to the runner.

Referring now to the details of the drawings, A designates the sleigh proper, which may be of any preferred or well-known construction, provided with suitable handles, B, and runners C.

On the front end of the runners I journal the wheels D at such a point that they will normally be clear of the ground, (say from one-half an inch to one inch above the acting portion of the runner.)

I do not wish to confine myself to any particular means for attaching the wheels, as it is evident that this may be done in various ways; but I wish it to be understood that the wheels are not to be adjusted up and down in relation to the runners when it is desired to convert the sleigh into a wheeled vehicle, or vice versa, but that the wheels at all times retain a fixed relation to the runners.

In Fig. 2 I have illustrated one of the many ways of attaching the wheels. In this figure E designates a clamp formed with a pin or stub axle, $a$, upon which is journaled the wheel. One end of this stub-axle is screw-threaded, as shown, to engage the adjusting-nut $b$. The clamp is formed with jaws $c$, adapted to embrace the runner, and one of said jaws has tapped therethrough a thumb-screw, $d$, by means of which it is secured to the runner.

It is evident that while I have shown two wheels I do not wish to be confined to such number, as the number may be varied—as, for instance, I may sometimes prefer a single central wheel in place of the two shown, or sometimes the central wheel in connection with the two shown, making three in all.

Having thus described my invention, what I claim to be new, and desire to secure by Letters Patent, is—

1. A sleigh provided at its forward end with a wheel journaled in fixed axles and normally free from contact with the ground, as set forth.

2. A sleigh combined with a wheel journaled in axles fixedly secured to the forward ends of the runners with its periphery normally above the acting face of the runner, substantially as and for the purpose specified.

3. The combination, with the runner, of the clamp E, having jaws $c$, to embrace the runner, and a stub-axle, $a$, to receive the wheel, and the thumb screw $d$, tapped through one of said jaws and engaging the runner, substantially as and for the purpose specified.

In testimony whereof I affix my signature in presence of two witnesses.

FAYETTE GROFF.

Witnesses:
CORNELIUS HOWLAND,
RICHARD HOWLAND.